Patented Jan. 7, 1947

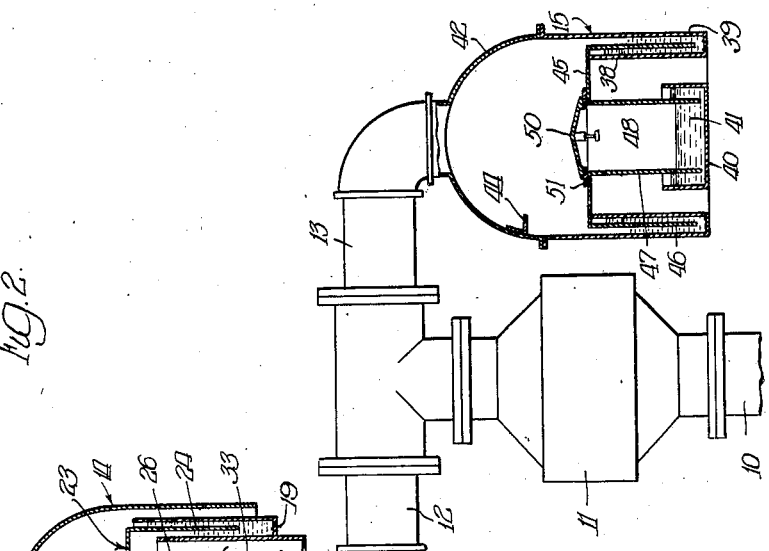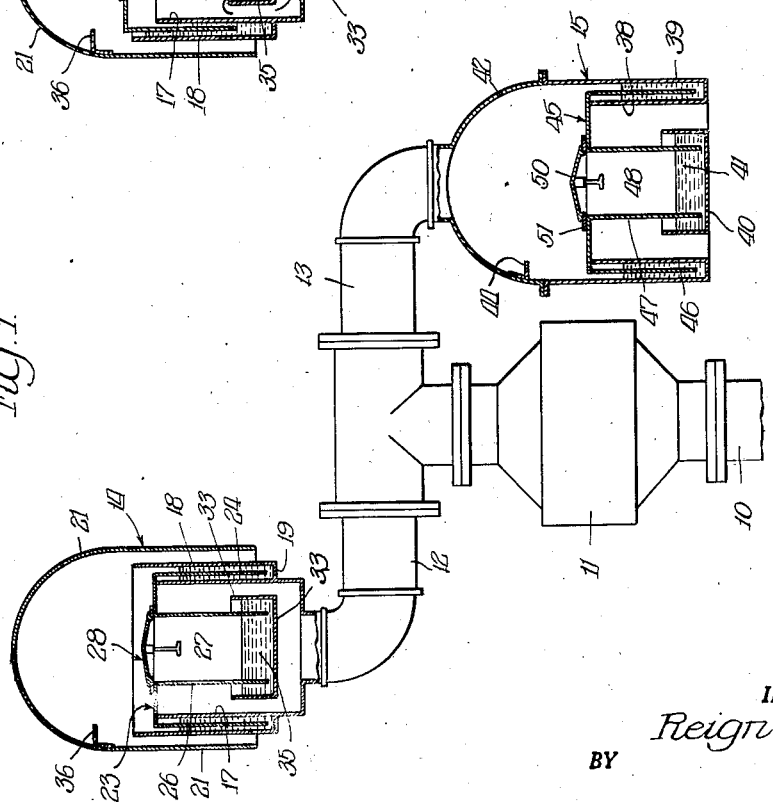

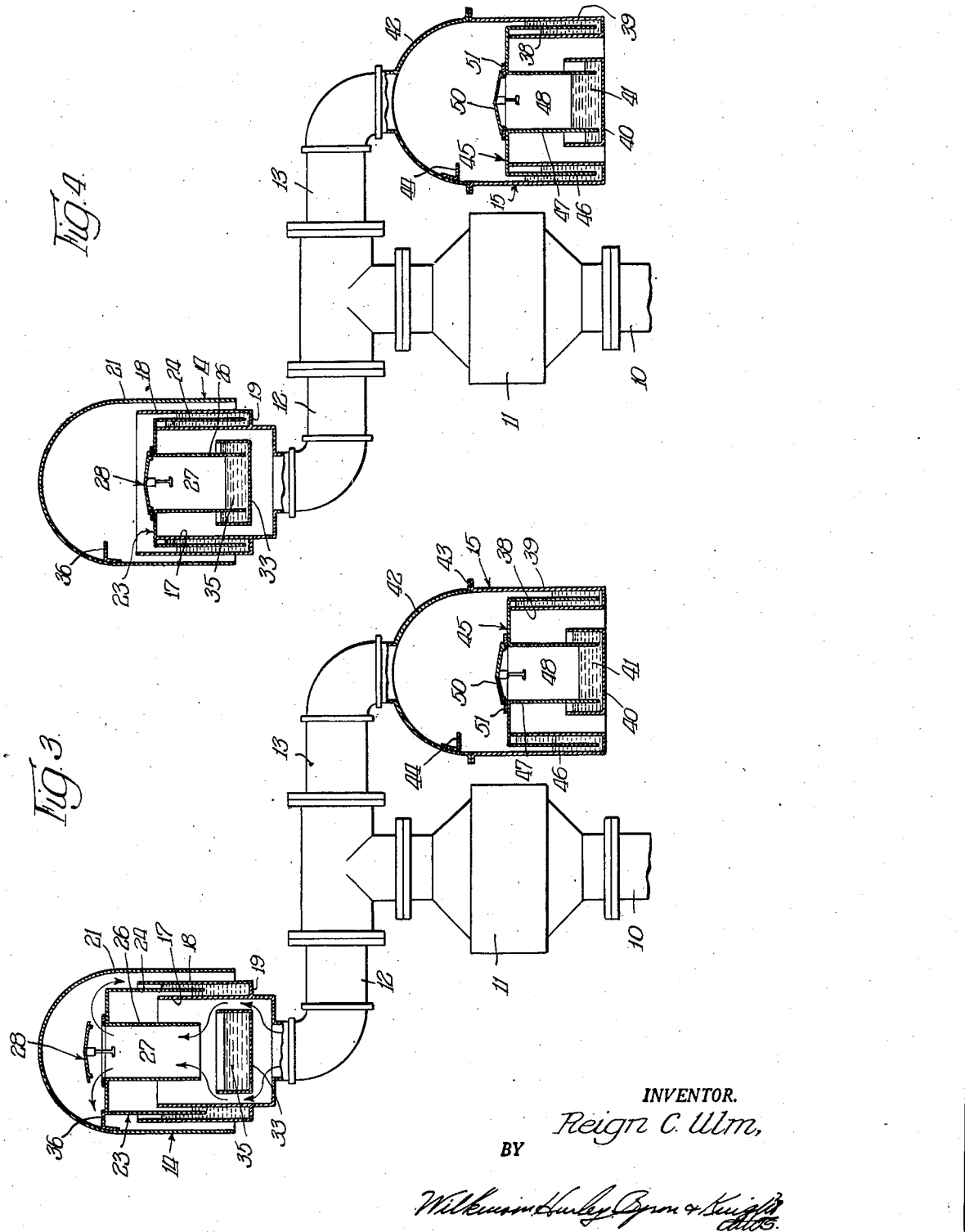

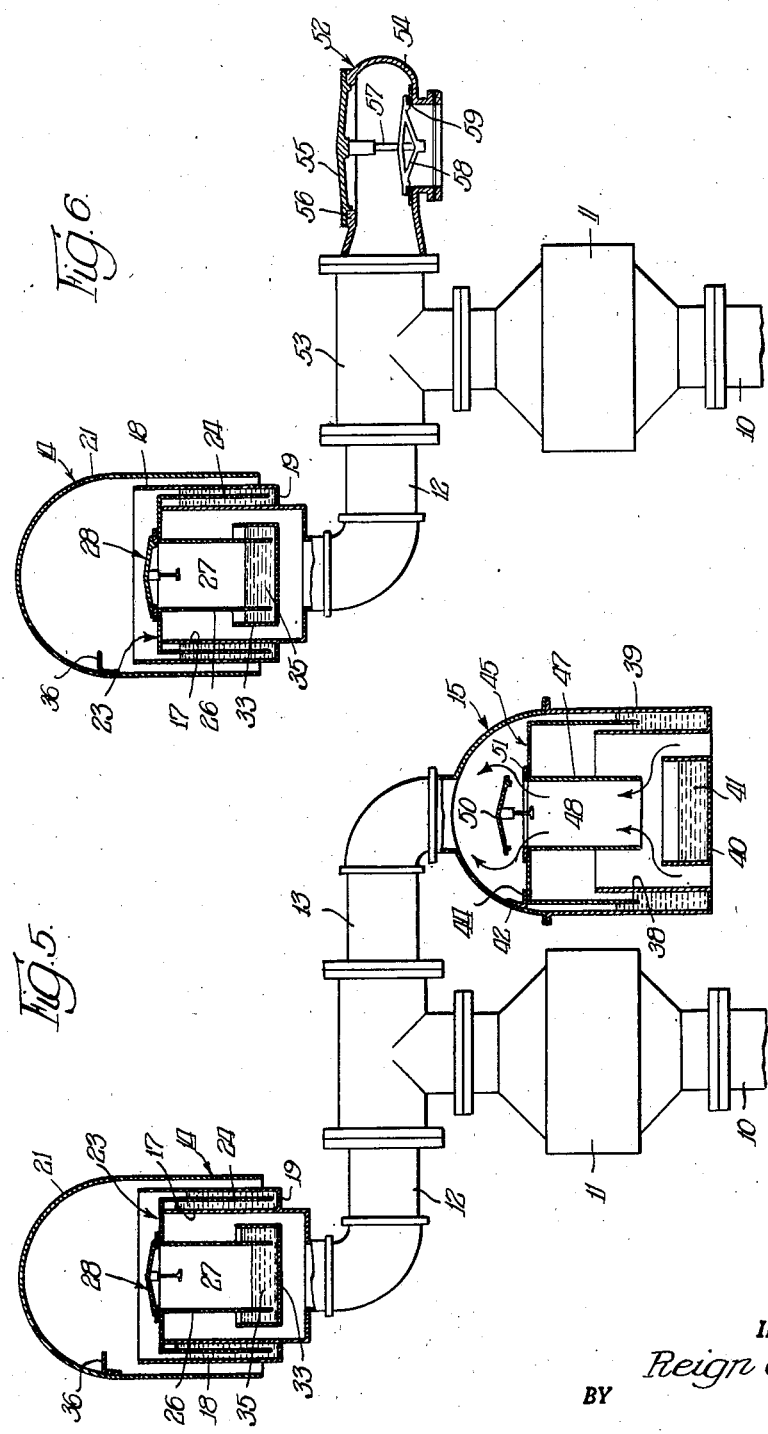

2,413,804

UNITED STATES PATENT OFFICE 2,413,804

PRESSURE AND VACUUM VENTING APPARATUS

Reign C. Ulm, East Chicago, Ind., assignor to Graver Tank & Mfg. Co., Inc., Catasauqua, Pa., a corporation of Delaware Application October 8, 1943, Serial No. 505,479

7 Claims. (Cl. 137—53)

The invention relates generally to valves and has reference particularly to a combination liquid seal and mechanical valve for controlling an atmospheric vent opening.

An object of the invention is to provide an improved pressure-vacuum type of venting apparatus whereby excessive pressures within a storage tank, for example, or the creation of a vacuum within such tank, can be effectively relieved before any damage is done to the tank or associated structure.

Pressure-vacuum valves as heretofore constructed have generally been of either of two types, liquid or mechanical. A liquid sealed opening is ideal since any liquid readily takes the shape of its container. However, liquid is easily separated and broken into droplets when air or vapor is bubbled through it. This constitutes the chief objection to the use of liquid since the liquid is carried out with the escaping vapors. There is another objection to liquid through which air or vapor is passing, and that is its changing specific gravity due to gaseous inclusions. A mechanical valve is ideal under releasing conditions since its specific gravity is constant and there is no tendency for particles to be picked up by the vapors. However, the valve seat will collect dirt after a time and eventually leak, thus destroying a tight seal under static conditions.

Since a liquid seal is most effective in keeping the vent opening vapor-tight under static conditions, whereas, a mechanical seal is most effective during vapor release, the present invention has for its primary object to combine the two types in a novel manner to form the ideal valve.

Another object of the invention is to provide venting apparatus using a liquid to seal the vent opening during static conditions and which will operate to release the gas under pressure or admit gas under vacuum in a manner that does not pass the gas through the sealing liquid.

A further object is to provide venting apparatus which will employ a movable bell having its lower end immersed in a sealing liquid at all times except when operative to release gas under pressure conditions or admit air under vacuum conditions.

Another object is to provide venting apparatus using a movable bell to obtain a liquid seal under static conditions and a movable valve element for effecting release.

Another object is to provide venting apparatus for tanks storing volatile liquid and the like having a valve in association with an atmospheric vent opening for operation when a pressure develops and having separate and independent valve also in communciation with its atmospheric vent for operation when a vacuum develops.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is an elevational view, parts being shown in vertical section, of the combination liquid seal and movable valve element coming within the invention;

Figure 2 is a view similar to Figure 1 but showing the pressure device in one of its initial operative positions for venting an excessive pressure to the atmosphere;

Figure 3 is another view similar to Figure 1 but showing the pressure device in full operative position whereby excessive pressures are vented to the atmosphere;

Figure 4 is a view similar to Figure 1 illustrating the different levels in the liquid seal of the vacuum device upon the initial development of a vacuum;

Figure 5 is a view similar to Figure 4 but showing the vacuum device in full operative position for admitting atmospheric air to relieve the vacuum;

Figure 6 is an elevational view of modified apparatus coming within the invention, parts being shown in vertical section, and including a combination valve for pressure operation and a mechanical valve for operation when vacuum conditions develop;

Figure 7:
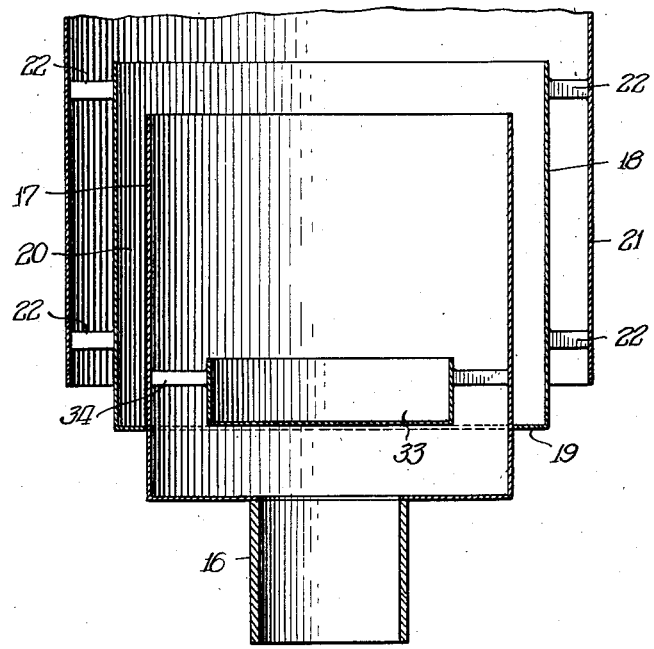
Figure 7 is a vertical sectional view showing details of the container and pan for the sealing liquids.

In Figures 1, 2 and 3 the operation of the combined liquid seal and mechanical valve is illustrated for venting excessive pressures from a storage tank or the like. Substantially similar operation takes place when the apparatus admits atmospheric air for relieving a vacuum condition. In each case initiation actuation comprises vertical movement of a movable bell in an upward direction whereby the lower end of the bell is withdrawn from its sealing liquid. This feature in the operation of the present apparatus positively insures that the escaping vapors will not pass or bubble through the liquid. Further increase of pressure after the movable bell has reached the upper limit of its travel will result in actuation of a movable valve element and venting of the vapors to the atmosphere or admission of air to relieve a vacuum.

Referring more particularly to Figures 1, 7, 8 and 9, the apparatus selected for illustrating the invention consists essentially of a main conduit 10 having connection with a storage tank or the like such as one containing a volatile liquid requiring atmospheric venting means. The conduit 10 includes a flame arrester 11 and the branch conduits 12 and 13, conduit 12 having suitable connection with venting apparatus 14 for operation when pressure conditions develop, and conduit 13 having connection in a similar manner with apparatus 15 for relieving vacuum conditions. As better shown in Figure 7, conduit 12 may connect with a circular part such as 16 to which is secured at its upper end the container 17. Said container is provided with a launder by means of the exterior wall 18 and bottom 19. The space 20 thus provided is generally referred to as a launder since the same is adapted to containing sealing liquid.

An external housing 21 is located over container 17 in a manner whereby the cylindrical wall of the external housing is spaced some distance from the wall 18 of the launder. Housing 21 is suitably supported by any convenient means such as the rods 22 which secure the housing to the wall 18 of the launder.

Figure 8:
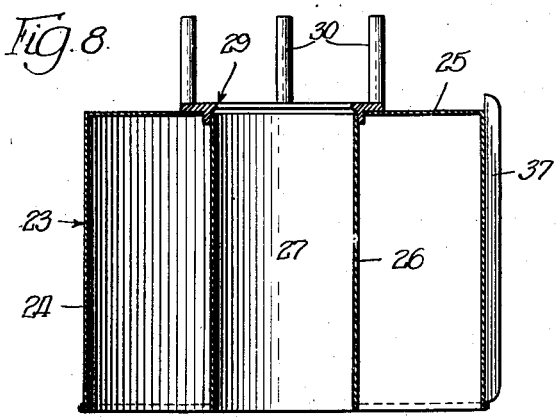
Figure 8 is a sectional view illustrating in detail the construction of the movable bell.
Figure 9:
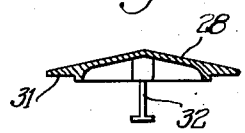
Figure 9 is a sectional view of the movable valve element adapted to have seating relation on the bell member.

The movable bell shown in Figure 8 consists of an inverted member having a central passageway adapted to be closed at its upper end by means of the movable valve element. Said bell is indicated in its entirety by numeral 23 and consists of a cylindrical container having an exterior wall 24, a top portion 25, and an interior cylindrical wall 26, which forms a central passageway 27. The upper end of the passageway is adapted to be closed by the movable valve element 28, best shown in Figure 9. Accordingly, said upper end is provided with a seat member 29 and upwardly extending guide rods 30 which prevent displacement of the movable valve element when the same has been forced upwardly in a vertical direction off said seat member. Element 28 has a peripheral valve seat 31 adapted to coact with the seat member 29 and said element centrally thereof carries a depending part 32. Said depending part 32 constitutes a stop for element 28 which in conjunction with other structure will operate to limit vertical movement of element 28 in an upward direction.

Figure 1 shows the movable bell in operative relation on container 17 with the wall or dip ring 24 of the bell having location within the launder and which is provided with the necessary sealing liquid. The pan 33 contains the liquid for sealing the central passageway 27 of the bell, said pan being suitably supported from the wall of the container 17 by any suitable means such as the rods 34 as shown in Figure 7. Referring to Figure 1, it will be observed that the interior wall or dip ring 26 of the movable bell is immersed at its lower end in sealing liquid 35 in said pan 33. As a result conduit 12 is sealed from the atmosphere by said sealing liquid and also by the movable valve element 28. In order to open conduit 12 to the atmosphere it is therefore necessary for the movable bell to rise to break the sealing relation which the liquid 35 has with respect to the lower end of passageway 27 and for the movable valve element 28 to also rise.

The operation of the venting device as above described is illustrated in Figures 1, 2 and 3. When normal pressures exist within the storage tank to which the venting apparatus is secured, it will be understood that similar pressure conditions will prevail within the container 17 having the exterior launder and which supports centrally thereof the pan 33 for the sealing liquid 35. The movable bell 23 will therefore assume a normal position, as shown in Figure 1, wherein the top wall 25 rests on and is supported by the wall of the container. The interior cylindrical wall 26 dips into the sealing liquid 35 at its lower end and thus the passageway 27 is closed by the sealing liquid. The movable valve element 28 is in contact with seat member 29 and the central passageway is additionally closed thereby. When excessive pressure develops within the tank the same is communicated through conduit 10 and branch conduit 12 to the container, which pressure is accordingly transmitted to the movable bell 23, causing the same to rise as in Figure 2. As shown in this figure, movement of the bell has been sufficient to withdraw the internal wall 26 from the sealing liquid 35. As a result the vapors under pressure are admitted to the passageway 27 and they therefore have direct action on the movable valve element 28. However, the weight of said valve element is such that it will retain its location on its seat member 29.

In Figure 3, the movable bell 23 has not only reached the stop member 36 but the valve element 28 has been lifted from its seat member by the excessive vapor pressure, which vapors thus escape to the atmosphere since the lower end of the housing 21 is open to the atmosphere. Venting of the vapors will continue until the pressure has been reduced sufficiently to allow the movable valve element 28 to again resume its seat on member 29. However, the movable bell will retain its elevated position against stop 36 until the vapors are further reduced in pressure either by a condensing of the vapors within the tank or by further venting past valve element 28. Eventually the pressure within the container will be reduced sufficiently to allow the movable bell to descend whereupon the lower end of the internal wall 26 will dip into the sealing liquid 35 and seal the central passageway.

During static conditions the venting apparatus of the invention will effect a seal by means of the liquid contained in the pan 33 together with the sealing liquid in the launder. To facilitate movement of the bell the same may be provided with a plurality of guide vanes 37 suitably fixed to the exterior surface of the cylindrical wall 24. Said guide vanes will hold the movable bell properly positioned within the launder and prevent excessive lateral movement during movement of the bell in a vertical direction. For releasing the vapors under pressure the venting apparatus employs the movable valve element 28 which functions as a mechanical valve and it will be observed that when said valve lifts, the liquid seal 35 will have been broken so that the vapors are not caused to pass or bubble through said sealing liquid.

The vacuum device for admitting air to relieve vacuum conditions which may develop within the tank embodies a similar combination of parts.

The container 38 is provided with an exterior wall 39 to form therewith a launder for containing sealing liquid. Said container supports in any suitable manner the pan 40 which likewise contains sealing liquid 41. An external housing 42 is fastened as at 43 to wall 39 and a stop 44 is fixed to the inside of said housing. The movable bell 45 is similar to that described for the pressure device, the same including an exterior cylindrical wall or dip ring 46, which has location within the launder of the container, and an interior cylindrical wall or dip ring 47 having its lower end normally dipping into the sealing liquid 41 to thereby close off the central passageway 48. The upper end of the passageway is additionally closed by the movable valve element 50 adapted to have location on the seat member 51 carried by the movable wall.

In the event vacuum conditions should develop in the tank or other storage system to which the present venting apparatus is applied, said conditions will be communicated by conduit 10 and branch conduit 13 to the interior of the housing 42 to thereby influence the movable bell 45. In other words, when sub-atmospheric pressures exist above the movable bell, atmospheric pressure under the same will cause the valve to rise and if said sub-atmospheric pressures fall further below atmospheric pressure the bell will eventually reach the limit of its upward movement defined by stop 44. This position of the bell is shown in Figure 5. Under these conditions the atmospheric pressure constitutes an excess over the sub-atmospheric pressure. As a result the lower end of the internal wall 47 is withdrawn from its sealing liquid 41, allowing atmospheric air to enter the central passageway to act on the movable valve element 50. The vacuum conditions are relieved, however, only by upward movement of this valve element to admit atmospheric air and when this action of the valve element takes place it will be understood that the movable bell will have been elevated into contact with stop 44. Thus the end of the central passageway 48 will have been withdrawn from the sealing liquid so that any atmospheric air that may be admitted by the movable valve element will not have any contact at all with the sealing liquid 41.

In Figure 6 a modification of the invention is disclosed wherein only the pressure device is constructed in accordance with the invention, there being provided a conventional mechanical valve 52 for operation under vacuum. Said mechanical vacuum valve is suitably attached to the T connection 53, which in turn has connection with conduit 10. The body portion 54 of the valve is provided with an upper closure member 55 secured to a seat member 56. A part 57 depends from the closure 55 and at the lower end of said part there is fixed a movable valve 58. Said valve 58, when in contact with its seat member 59, closes off the housing 54 from the atmosphere and thus maintains desired pressure conditions within the tank or other storage system to which the venting apparatus is secured. When a vacuum develops within the tank the pressure in housing 54 above valve 58 is correspondingly reduced and when a predetermined sub-atmospheric pressure is reached valve 58 will accordingly lift to admit atmospheric air whereby the vacuum conditions are relieved.

In the venting device of the invention only two main operating parts are included, namely, the movable bell and the movable valve element carried by the bell. Said bell member is preferably in the form of an annulus, having an outer wall and a substantially concentric inner wall. In operation said bell member has initial movement and the pressure of the air or gaseous vapors does not act on the movable valve until said bell has lifted to break the liquid seal. Under static conditions the tank is thus sealed by said liquid, whereas, actual release of the air or vapors is accomplished by the movable valve element. Even though this element may collect dirt over a period of long use and effect an improper seating, the bell will nevertheless descend to make a liquid seal to retain the vapors within the tank until a releasing operation again takes place. It is possible for some gaseous vapors to leak past the mechanical valve 50, particularly when the chamber above the valve is under fairly high pressure. If any leakage of vapors does take place it may influence the liquid level of the sealing liquid.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In apparatus for venting a storage tank to relieve pressure conditions, a bell member forming with a second member a chamber within the bell and having movement with respect to the second member in a vapor-tight manner from a deflated normal position to an inflated operative position, a wall portion depending from the bell member to within the chamber to form an exit passageway therefor, means supporting a sealing liquid within the chamber for closing the said passageway by the lower end of the wall portion dipping into said liquid, said sealing liquid being disposed to receive the lower end of the wall portion when the bell member is in deflated position, whereby the passageway is liquid sealed when normal conditions prevail, and a fluid pressure responsive valve element supported by the bell member for closing the upper end of the passageway, said valve element being constructed and arranged to relieve the chamber when the bell member has moved to an inflated position and withdrawn the end of the wall portion from the sealing liquid.

2. In apparatus for venting a storage tank to relieve pressure conditions, the combination with stationary means, of a movable top wall therefor forming a chamber with said means, said top wall maintaining sealing relation with said means and having movement from a deflated normal position to an inflated operative position, a substantially tubular wall portion depending from said top wall and forming an exit passageway for said chamber, means supporting a sealing liquid within the chamber for closing the passageway when the top wall is in a deflated normal position by having the lower end of the tubular member dip into said liquid, and a fluid pressure responsive valve element supported on said top wall for closing the other end of the exit passageway, said valve element being constructed and arranged to have opening movement to relieve the chamber when the top wall has moved to an inflated position and withdrawn the end of the tubular wall portion from the sealing liquid.

3. In apparatus for venting a storage tank to relieve pressure conditions, the combination with stationary means, of a movable top wall therefor forming a chamber with said means, said top wall maintaining sealing relation with said means and having movement from a deflated normal position to an inflated operative position, a substantially tubular wall portion depending from said top wall and forming an exit passageway for said chamber, means supporting liquid sealing means within the chamber for closing the exit passageway when the top wall is in deflated position, and exterior closing means for the exit passageway including an outwardly fluid pressure responsive valve element supported on the top wall for relieving excess pressure fluid from the interior of the tubular wall portion.

4. A valve device comprising a container having an open top, a member adapted to have movement with respect to said container to form a variable closed chamber, a wall portion extending from the member to within the chamber to form a passageway therefor, a valve element supported by the member and positioned over said passageway, means supporting a sealing liquid within the chamber for closing the bottom of the passageway when the lower end of said wall portion dips into the sealing liquid, and an additional liquid sealed passageway connecting the outer part of said chamber outside said wall portion with the outside of the container, said valve element constructed and arranged to have sealing action with the member to normally close the first-named passageway, but to open to vent the passageway in response to fluid pressure after said wall portion has been lifted out of the sealing liquid.

5. A combined mechanical and liquid seal valve comprising an open annular launder adapted to contain sealing liquid, an open receptacle also adapted to contain sealing liquid and positioned within but having spaced relation with the inner wall of said launder, an outer dip ring depending into said launder and upwardly and downwardly movable therein, an inner dip ring depending into said receptacle, a member connecting the top portions of said dip rings whereby an annular bell is formed, a valve seat provided by and substantially concentric with said bell, and a fluid pressure responsive valve member adapted to contact said seat, whereby the upper end of the inner dip ring is closed when the valve member is in contact with said seat and is open for relieving excess pressure fluid from within the inner dip ring when the valve member is lifted from said seat, the annular launder, receptacle and bell being so arranged that in a lower operative position of the bell both dip rings dip into sealing liquid while in an upper operative position of said bell only the outer dip ring dips into sealing liquid.

6. A combined mechanical and liquid seal valve as defined in claim 5, additionally including guiding means cooperating with one of said dip rings for guiding the same in its up and down movements.

7. A combined mechanical and liquid seal valve as defined by claim 5, additionally including guiding means cooperating with one of said dip rings for guiding the same in its up and down movement, and other guiding means carried by the bell for guiding the valve member in its movement.

REIGN C. ULM.